June 7, 1949.

H. L. GEATER 2,472,414

LAWN TRIMMING MACHINE

Filed Oct. 30, 1945

2 Sheets-Sheet 1

Inventor
Harold L. Geater
By
Attorney

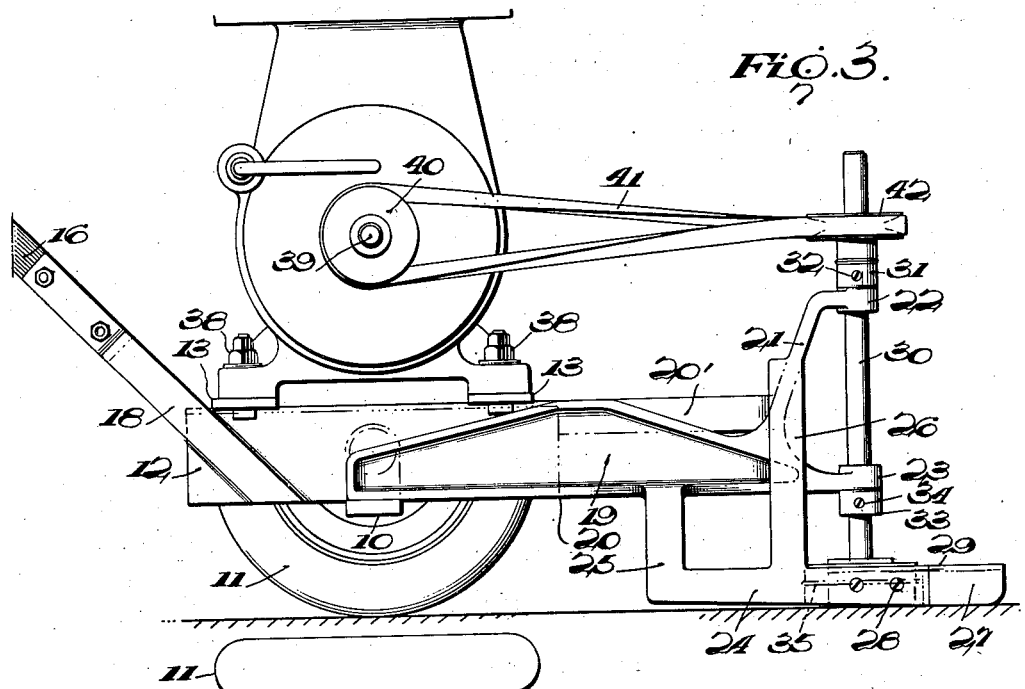
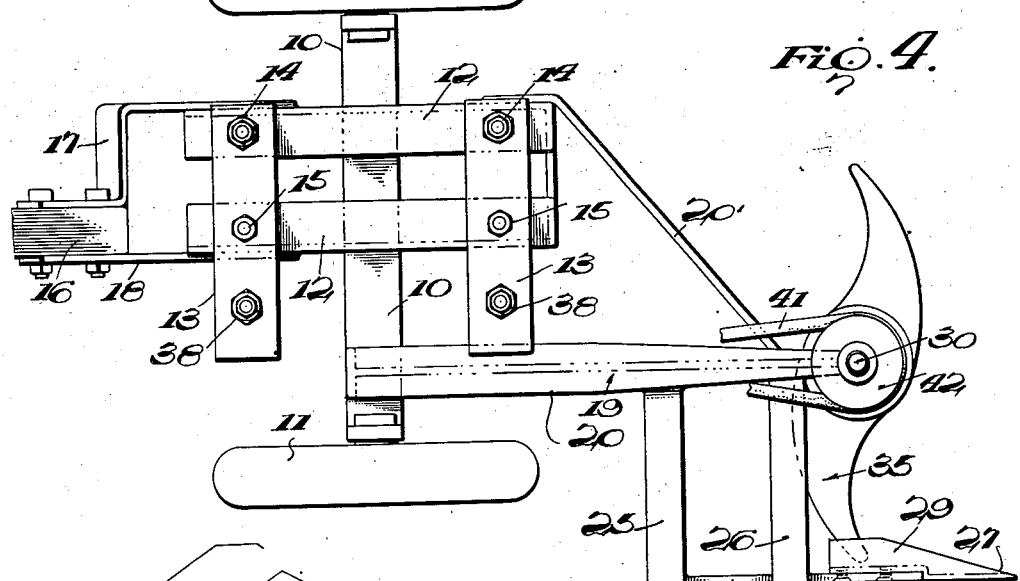
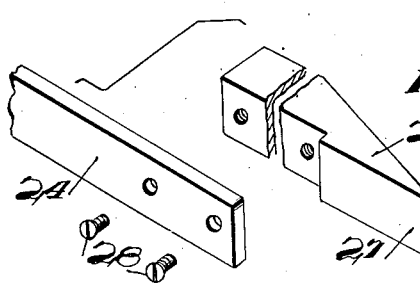

Patented June 7, 1949

2,472,414

UNITED STATES PATENT OFFICE 2,472,414

LAWN TRIMMING MACHINE

Harold L. Geater, Vinton, Iowa

Application October 30, 1945, Serial No. 625,546

4 Claims. (Cl. 56—25.4)

My invention relates to lawn cutters or trimmers.

An important object of the invention is to provide a machine of the above mentioned character which may trim the lawn close to upstanding projections without liability of the rotating cutter striking the projections.

A further object of the invention is to provide a machine of the above mentioned character having a rapidly rotating cutter, creating a suction which draws the grass, weeds or the like toward the rotatable cutter, into the path of travel of the same.

A further object of the invention is to provide a machine of the above mentioned character, so constructed that the cut grass or weeds tend to gather toward the rotating shaft of the cutter, above the cutter, and are scattered by the rotating cutter.

A further object of the invention is to provide a machine of the above mentioned character having a guard to travel close to the upstanding projection and to prevent the rotary cutter from contacting with the projection.

A further object of the invention is to provide a machine of the above mentioned character, which is power driven and balanced for convenient manual manipulation.

Other objects and advantages of the invention will be apparent during the course of the following description.

Figure 1:
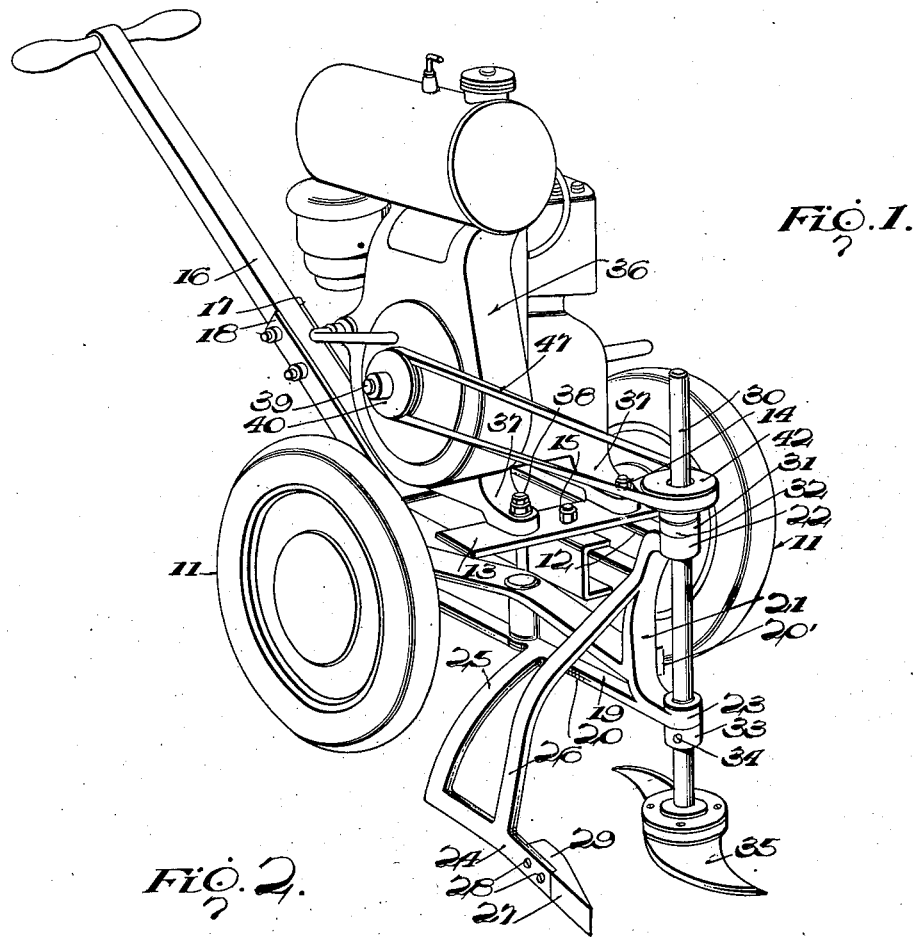
Figure 2:
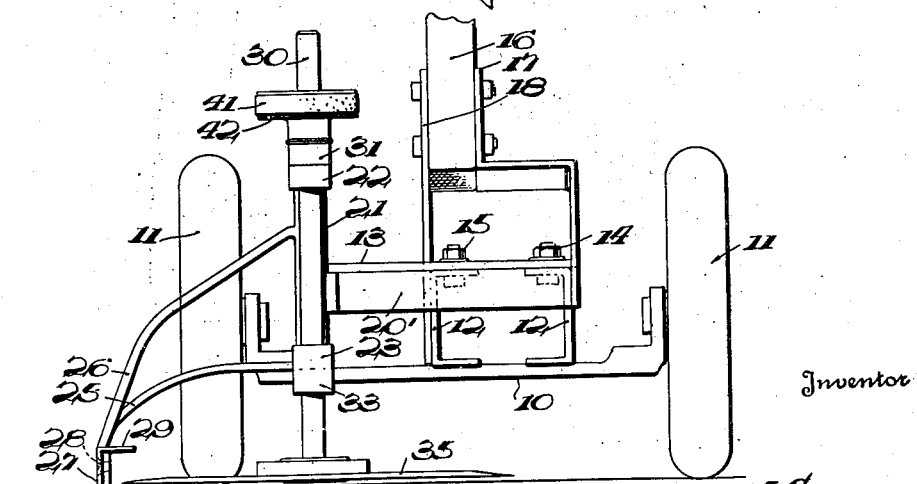

In the accompanying drawings forming a part of this application and in which like numerals are employed to designate like parts throughout the same, Figure 1 is a perspective view of a trimmer machine embodying my invention, Figure 2 is a front end elevation of the wheeled frame and associated elements, the motor being removed, Figure 3 is a side elevation of the machine, parts of the motor broken away, Figure 4 is a plan view of the wheeled frame, the motor being removed, Figure 5 is an exploded perspective view of the guard tip.

In the drawings, wherein for the purpose of illustration is shown a preferred embodiment of my invention, the numeral 10 designates an underslung axle, supported by wheels 11. Rigidly mounted upon the axle 10 between the wheels 11 are bolsters or beams 12, which may be secured to the axle by welding or the like. These bolsters extend longitudinally of the machine, are parallel, are generally horizontal in use, and the axle 10 is adjacent to the longitudinal center of the bolsters. Arranged upon the bolsters 12, near their ends, and upon opposite sides of the axle 10, are transverse horizontal rigid straps 13, which are rigidly clamped to the bolsters by bolts 14 and 15. The bolsters 12 and straps 13 constitute the frame of the machine.

At the rear of the frame and the axle 10 is an inclined handle 16, the lower ends of which are rigidly connected with straps 17 and 18. The strap 18 is straight and is rigidly secured to one bolster 12 by welding or the like and the strap 17 is laterally offset and is rigidly secured to the other bolster 12, by welding or the like. The handle 16 and inner bolster 12 are at the longitudinal center of the axle 10, as shown.

The numeral 19 designates a cutter carrying unit, comprising a generally horizontal arm 20, extending longitudinally forwardly of the frame and wheels, and parallel with the wheels. The rear end of the arm 20 is mounted upon the axle 10 and is rigidly secured thereto by welding or the like. The arm 20 is inwardly of and near the right wheel 11, when the machine is propelled forwardly. Preferably formed integral with the forward end of the arm 20 is a vertical fork 21, having upper and lower vertical bearings 22 and 23, at its ends, as shown. The numeral 20' is a horizontal diagonal brace rigidly secured to the lower portion of the fork 21 and the outer bolster 12. The numeral 24 designates a guard, which is preferably slightly inclined and extends upwardly toward its rear end when the frame is horizontal, to prevent the rear end of the guard from digging into the ground, when the machine is shifted rearwardly. Preferably formed integral with the rear end of the guard 24 is a laterally extending curved arm 25, extending upwardly inwardly, and formed integral with the arm 20 near its bottom edge. A companion arm 26 is formed integral with the guard 24 near its longitudinal center and the arm 26 is inclined upwardly and is preferably integral with the upper end of the vertical fork 21. These arms form a strong construction for supporting the guard 24 and holding it in place. The arms 25 and 26 support the guard 24 laterally outwardly of the adjacent wheel 11, so that the guard may travel close to the upstanding projection, while the wheel is spaced from the same.

The guard 24 is provided at its forward end with a removable pointed element or shoe 27, the rear end of which overlaps the guard 24 and is preferably detachably secured thereto by bolts 28 or the like. This point is provided at its upper edge with an inwardly projecting horizontal flange 29, as shown.

The numeral 30 designates a vertical shaft, journalled in the bearings 22 and 23. This shaft 30 has an adjustable collar 31 clamped thereto by a set screw 32, and this collar is above the bearing 22. The shaft 30 also has an adjustable collar 33, clamped thereto by a set screw 34, and collar 33 is below the bearing 23. By manipulation of these collars, the shaft 30 may be vertically adjusted.

Disposed at the lower end of the vertical shaft 30 is a horizontally rotating cutter or blade 35, rigidly mounted upon the shaft 30 by any suitable means. This blade is adjusted to the proper elevation, and its ends travel inwardly of and close to the guard 24 and beneath the horizontal flange 29. This flange tapers forwardly and not only covers the ends of the cutter 35, when it rotates, but guides the grass or the like into the path of travel of the cutter.

The numeral 36 designates an internal combustion engine of any well known or preferred type, having depending legs 37. One longitudinal pair of legs 37 is mounted upon the straps 13 adjacent to one bolster 12 and is clamped to these straps by the bolts 14, while the other longitudinal pair of legs 37 are mounted upon the straps 13 and are clamped thereto by bolts 38. The engine has the usual crank shaft 39, which is horizontal, which drives a vertical grooved pulley 40, engaged by a belt 41, extending forwardly to engage a horizontal grooved pulley 42, clamped upon the vertical shaft 30. The pulley 42 may be longitudinally adjustable upon the shaft 30.

The operation of the machine is as follows:

When the engine 36 is started, its speed may be regulated to drive the rotary cutter at a desired speed. The rotary cutter is ordinarily driven at a relatively high speed and satisfactory results are obtained by rotating the same from 1500 to 1800 R. P. M., although this speed may be considerably varied. With the cutter 35 rotating, the machine is manually propelled forwardly, and the guard 24 may pass close to upstanding projections, such as monuments or the like. This will enable the cutter 35 to travel close to the obstructions or projections to properly trim the grass without liability of striking the projections. The motor 36 has its longitudinal center in alignment with the longitudinal center of the frame of the machine, and the transverse longitudinal center of the motor is in alignment with the axle 10. The machine is well balanced and this renders its manual manipulation easy. The machine is propelled forwardly manually by the handle, and may be transversely tilted, to raise and lower the rotary cutter and guard 24, to compensate for inequalities in the elevation of the lawn.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim is:

1. A lawn trimming machine, comprising an axle, wheels supporting the axle, a generally horizontal arm rigidly connected with the axle and extending forwardly beyond the wheels and disposed upon one side of the longitudinal center of the axle, a substantially vertical fork carried by the forward end of the arm and provided with upper and lower bearings, a guard arranged near one wheel and positioned laterally outwardly of the same, arms connected with the guard, one arm being secured to the forwardly extending arm and the other arm to the fork near its upper end, a vertical shaft held within the bearings, a rotatable cutter carried by the lower end of the shaft and arranged inwardly of the guard and traveling in close relation thereto, a motor mounted upon the axle, driving connecting means between the motor and shaft, and a handle connected with the axle and extending upon the rear side thereof.

2. A lawn trimming machine, comprising an axle, wheels mounted upon the axle near its ends, a single generally horizontal arm having its rear end arranged adjacent to one wheel and inwardly thereof and directly rigidly mounted upon the axle and projecting forwardly beyond the adjacent wheel for a substantial distance, a vertical fork carried by the forward end of the single arm and projecting above the same and provided at its top and bottom with bearings, a substantially horizontal guard bar disposed outwardly of the wheel adjacent to the single arm and extending longitudinally of the arm, a pointed element carried by the forward end of the guard bar and having an upper horizontal flange provided with an inclined edge, a transverse inclined rear arm having its lower end secured to the rear end of said guard bar and its upper end secured to the intermediate portion of the single horizontal arm adjacent to its bottom, a forward inclined arm arranged in advance of the rear inclined arm and having its lower end secured to the guard bar near the longitudinal center thereof and having its upper end secured to the vertical fork, a vertical shaft held within the bearings of the fork, collars adjustably mounted upon the vertical shaft and engaging the bearings so that the vertical shaft may be raised and lowered with respect to the bearings and held in the selected adjusted position, a rotary cutter mounted upon the lower end of the vertical shaft and travelling close to the pointed element and beneath the flange thereof, longitudinal horizontal bolsters disposed upon the inner side of the single horizontal arm and separate therefrom and rigidly secured to the axle, a generally horizontal diagonal brace secured to the lower end of the vertical fork and the forward end of one bolster, a motor mounted upon the bolsters, driving connecting means between the motor and vertical shaft, a handle arranged at the rear of the longitudinal bolsters and at the longitudinal center of the axle, and means rigidly connecting the handle with the rear ends of the bolsters.

3. A lawn trimming machine, comprising an axle, wheels supporting the axle, a single substantially horizontal longitudinal arm disposed adjacent to one wheel and inwardly thereof and secured to the axle and projecting forwardly of the adjacent wheel, a vertical fork secured to the single arm and projecting above the same and including upper and lower bearings, a substantially horizontal guard bar disposed outwardly of the wheel adjacent to the single arm and extending longitudinally of the same, a pointed shoe carried by the forward end of the guard bar and having an inclined edge, a transverse inclined rear arm secured to the rear end of the guard bar and to the single arm, a forward inclined arm secured to the guard bar and to the vertical fork, a vertical shaft held within the bearings of the fork, a rotary cutter secured to the lower end of the vertical shaft and travelling close to the pointed shoe, a motor mounted upon the axle, driving connecting means between the motor and vertical shaft, and a handle arranged at the rear of the axle and connected thereto and extending rearwardly therefrom.

4. A lawn trimming machine, comprising an axle, wheels secured to the axle near its outer ends, a single substantially horizontal arm disposed adjacent to one wheel and inwardly thereof and upon one side of the longitudinal center of the axle, the single arm projecting forwardly of the adjacent wheel, a vertical fork carried by the forward end of the single arm and projecting above the same and provided at its top and bottom with bearings, a substantially horizontal guard bar disposed outwardly of the wheel adjacent to the single arm and extending longitudinally of the arm, a rear transverse arm secured at its outer end to the guard bar and at its inner end to the single arm, a forward transverse arm secured at its outer end to the guard bar and at its inner end to the vertical fork, a vertical rotatable shaft held within the bearings of the fork, a rotary cutter mounted upon the lower end of the vertical shaft and travelling close to the guard bar, longitudinal horizontal bolsters disposed upon the inner side of the single arm and secured to the axle, one of said bolsters being disposed at the longitudinal center of the axle, the other bolster being disposed upon the opposite side of the longitudinal center with respect to the single arm, a generally horizontal diagonal brace secured to the vertical fork and to one bolster, a motor mounted upon the bolsters, driving connecting means between the motor and vertical shaft, a handle disposed at the rear of the bolster and at the center of the axle and extending rearwardly longitudinally thereof, and means to rigidly connect the handle to the rear ends of the bolsters.

HAROLD L. GEATER.

REFERENCES CITED

The following references are of record in the file of this patent:

UNITED STATES PATENTS

| Number | Name | Date |
|---|---|---|
| D. 145,438 | Goodall | Aug. 20, 1946 |
| 1,830,871 | Damagala | Nov. 10, 1931 |
| 2,143,057 | Danielson | Jan. 10, 1939 |
| 2,203,198 | Junge | June 4, 1940 |
| 2,312,972 | Orr | Mar. 2, 1943 |

FOREIGN PATENTS

| Number | Country | Date |
|---|---|---|
| 391,967 | Great Britain | May 11, 1933 |